United States Patent [19]

McGlasson et al.

[11] 3,859,145

[45] Jan. 7, 1975

[54] PASSIVATION OF BRAZED JOINTS TO FLUORINATING ATMOSPHERES

[75] Inventors: Donald S. McGlasson, Harriman; James T. Tidwell, Oak Ridge; Charles E. Weaver, Knoxville; Charles A. Culpepper, Oak Ridge, all of Tenn.

[73] Assignee: The United States of America as represented by the United States Atomic Energy Commission, Washington, D.C.

[22] Filed: Nov. 8, 1973

[21] Appl. No.: 414,027

[52] U.S. Cl.................... 148/20.3, 29/487, 29/504, 148/34, 148/127
[51] Int. Cl............................ C22f 1/02, C22f 1/04
[58] Field of Search........... 148/127, 34, 13.1, 20.3, 148/20.6; 29/487, 504, 484

[56] References Cited
UNITED STATES PATENTS
3,332,773   7/1967   Dudas et al......................... 148/127

*Primary Examiner*—R. Dean
*Attorney, Agent, or Firm*—John A. Horan; David S. Zachry; F. O. Lewis

[57] ABSTRACT

A method for enhancing the resistance to corrosion by fluorinating atmospheres of brazed joints comprising aluminum or aluminum-alloy base metals and an intervening layer of aluminum-silicon alloy filler metal, this layer containing silicon as a continuous network extending to at least one surface of the joint. The method comprises heating the brazed joint to convert substantially all of the silicon network to discrete particles.

5 Claims, No Drawings

PASSIVATION OF BRAZED JOINTS TO FLUORINATING ATMOSPHERES

BACKGROUND OF THE INVENTION

This invention was made in the course of, or under, a contract with the United States Atomic Energy Commission.

This invention relates generally to treatments for rendering aluminum or aluminum-alloy brazed joints more resistant to fluorinating atmospheres. More particularly, it relates to a heat-treatment for increasing the resistance to fluorinating atmospheres of a brazed joint comprising aluminum and/or aluminum-alloy structural members and an intervening zone of aluminum-silicon alloy filler metal. The term "brazed joint" is used herein to refer to a joint which has been produced by heating juxtaposed base metals and a filler metal, the applied temperature being above about 800°F and below the melting point(s) of the base metal(s).

Some types of brazed joints of the kind composed of aluminum or aluminum-alloy structural members separated by a zone of aluminum-silicon alloy filler metal are readily attacked by gaseous fluorinating agents, such as fluorine, bromine trifluoride, and hydrogen fluoride. Continued exposure of such joints to a fluorinating atmosphere results in increasing porosity in the filler-metal region and in progressive weakening of the joint. For instance, a heat exchanger whose external surfaces were designed to be exposed to hot, gaseous uranium hexafluoride was fabricated by dip-brazing external fins of 3003 aluminum alloy to extruded channels of 3003 aluminum alloy. The filler metal, which was in the form of a foil interposed between the fins and channels, was a commercially available binary aluminum-silicon brazing alloy having a nominal silicon content of 12 wt-%. The assembly was pre-heated to about 1035°F by immersion in a molten salt and then was brazed by dipping in molten flux at about 1090°F. The suitability of the resulting assembly for use in gaseous uranium hexafluoride was tested by exposing the assembly for about 48 hours to a fluorine-containing atmosphere at elevated temperature. The brazed joints soon developed considerable porosity and deteriorated to such an extent that it was apparent they would be unacceptable for use in gaseous uranium hexafluoride.

It is well known that in some industrial applications welded aluminum-alloy joints—i.e., joints produced at fusion temperature—are heat-treated to reduce residual stresses in the vicinity of the weld. In some operations involving the welding of structural members composed of heat-treatable aluminum alloys, the resulting weldment is heat-treated to increase its strength or to improve various other mechanical properties.

SUMMARY OF THE INVENTION

It is an object of this invention to provide a novel method for increasing the resistance to fluorinating atmospheres of brazed joints comprised of aluminum or aluminum-alloy structural members and an intervening zone of aluminum-silicon alloy filler metal.

It is another object to provide a method for passivating a brazed joint comprising aluminum or aluminum-alloy structural members and an intervening layer of aluminum-silicon alloy, the layer containing silicon as a continuous second phase.

A further object is to provide a simple and inexpensive method for passivating aluminum and aluminum-alloy joints brazed with aluminum-silicon alloy.

This invention can be summarized as follows:

The method of increasing the resistance to corrosion by fluorinating atmospheres of a brazed joint formed of aluminum or aluminum-alloy base metals and an intervening layer of aluminum-silicon alloy, said layer containing a network of silicon extending to a surface thereof, comprising heating said joint to a temperature effecting conversion of substantially all of said network to discrete particles.

DESCRIPTION OF THE PREFERRED EMBODIMENT

We have found that aluminum or aluminum-alloy joints brazed with aluminum-silicon alloy filler metal are subject to progressive attack by fluorinating atmospheres if the fused, filler-metal portion of the joint contains silicon as a continuous second phase. That is, we have found that joints brazed with aluminum-silicon alloy are subject to continuing deterioration in fluorinating atmospheres if the joints contain a network of contiguous silicon particles (e.g., platelets) extending to at least one exterior surface of the joint. We find that this kind of network is present in joints brazed with various aluminum-silicon alloy filler metals, such as commercially available binary filler alloys nominally containing 7.5, 10, or 12 wt-% silicon. We have not established whether filler metals containing lower concentrations of silicon will form the above-described silicon network, but this can be readily determined by conventional examination of the joints produced with such filler metals.

Brazed joints containing silicon as a continuous second phase deteriorate rapidly in fluorinating atmospheres because of the progressive volatilization, or leaching, of the silicon by the fluorinating agent. Typically, the silicon is converted to gaseous silicon tetrafluoride. Those silicon particles at the surface are, of course, the first to be leached away, but in time the leaching progresses inward along the network. Eventually, the resulting porosity may extend completely through the joint. Our invention is directed to preventing or limiting such progressive deterioration.

We have found that the resistance to fluorination of brazed joints of the kind described can be enhanced markedly by heating the brazed joint to a temperature effecting conversion of substantially the entire silicon network to discrete particles. This simple but effective treatment limits the silicon-leaching action to those silicon particles in the surface layer of the filler-metal portion of the joint, preventing the progressive deterioration described above. The minimum temperature effective in so passivating a particular brazed joint will vary, depending on such factors as time, concentration of other alloying elements and impurities and the morphology and size, especially thickness, of the silicon particles. A suitable combination of time and temperature for the passivation of a given brazed joint can be determined readily by routine experimentation, as by furnacing samples of the joint at various times and temperatures and subjecting the treated samples to metallurgical examination. In general, passivation can be accomplished effectively at temperatures in the range of about 575° to 1035°F. At temperatures below about 575°F, the time required for the diffusion of the silicon particles from their network sites becomes impractically long; at still lower temperatures, an appreciable portion of the silicon network may remain interconnected. We have found that at temperatures above about 1035°F, the interconnected silicon particles tend to grow and are less likely to assume the discrete state. In general, substantial improvement in the corrosion resistance of brazed joints can be effected by maintaining the joints at a temperature in the range of about 575°–1035°F for a period in the range of about 30 minutes to 24 hours.

Our passivation treatment can be conducted in any suitable heating means, such as conventional furnaces of the induction, direct-fired, salt-bath types. When the brazed joints are not passivated by immersion in a salt bath or the like, it is preferable to conduct the passivation operation in a non-oxidizing atmosphere. The manner in which the joint is cooled following passivation is not critical. If desired, the joint may be permitted to return gradually to room temperature; alternatively, it can be quenched in liquid or cooled with forced air.

This method of passivation is applicable to joints comprised of aluminum or aluminum-alloy structural members, or base metals, and having the above-described network of silicon in the fused filler-metal region therebetween. The structural members can be composed of nominally pure aluminum or of any aluminum alloy brazeable with aluminum-silicon filler metal. The base metals may, for example, be nonheat-treatable alloys (such as 3003 and 5052) or heat-treatable alloys (such as 2024 and 6061). The structural members may be wrought or cast. It will be understood that references herein to brazed joints having a zone or layer of aluminum-silicon filler metal are meant to include a zone or layer of aluminum-silicon alloy containing not only impurities characteristic of brazed joints but also various modifiers and additives present in the original filler metal.

Our method for passivation is illustrated below in further detail.

EXAMPLE

As mentioned above ("Background of the Invention"), heat exchanger fins of 3003-alloy were jointed to 3003-alloy extruded channels by interposing a sheet of aluminum-12 percent silicon alloy therebetween and dip-brazing in molten flux at a temperature of 1090°F. The resulting brazed joints, which contained a continuous network of silicon, developed unacceptable porosity when exposed to a fluorine-containing atmosphere, indicating that such joints would be unacceptable for use in gaseous uranium hexafluoride.

An identical heat exchanger assembly was cleaned to remove flux residues and then was passivated in accordance with this invention. Passivation was accomplished by placing the assembly in the heating chamber of a vacuum furnace and maintaining the chamber at a temperature of 1035°F for 60 minutes. Following passivation, the assembly was cooled to room temperature in the water-cooled vestibule of the vacuum furnace. The assembly then was subjected to the same exposure test as the unacceptable assembly referred to above. The weight loss of silicon from the typical brazed joint was found to be 1 percent or less, indicating that only the silicon at the surfaces of the joint had been leached by conversion to the tetrafluoride. Metallurgical examinations of the assembly established that the brazed joints were sufficiently corrosion-resistant for long-term use in gaseous uranium hexafluoride. Optical examinations confirmed that the original network of silicon platelets had been converted to discrete particles enveloped by aluminum.

Metallurgical examination of joints passivated in accordance with this invention have established that most of the discrete silicon particles in the filler-metal region are of microscopic rather than submicroscopic size. Typically, the particle shapes range from platelets to spheroids. The shape of the particles is not believed to be of significance with respect to passivation. The passivation treatment does not leave the filler-metal alloy in a metastable condition but rather leaves the aluminum and silicon phases in equilibrium with respect to particle size and distribution.

What is claimed is:

1. The method of increasing the resistance to corrosion by fluorinating atmospheres of a brazed joint formed of base metals selected from the group consisting of aluminum and aluminum alloys and an intervening layer of aluminum-silicon alloy filler metal, said layer containing a continuous network of silicon extending to a surface of the joint, comprising heating said joint to a temperature effecting conversion of substantially all of said silicon network to discrete particles.

2. The method of claim 1 wherein said temperature is in the range of about 575° to 1035°F.

3. The method of claim 2 wherein said temperature is maintained for a period in the range of about 30 minutes to 24 hours.

4. The method of claim 1 wherein said metal is a non-heat-treatable alloy.

5. The method of claim 1 wherein said joint is heated to said temperature in a non-oxidizing atmosphere.

* * * * *